Figure 1:
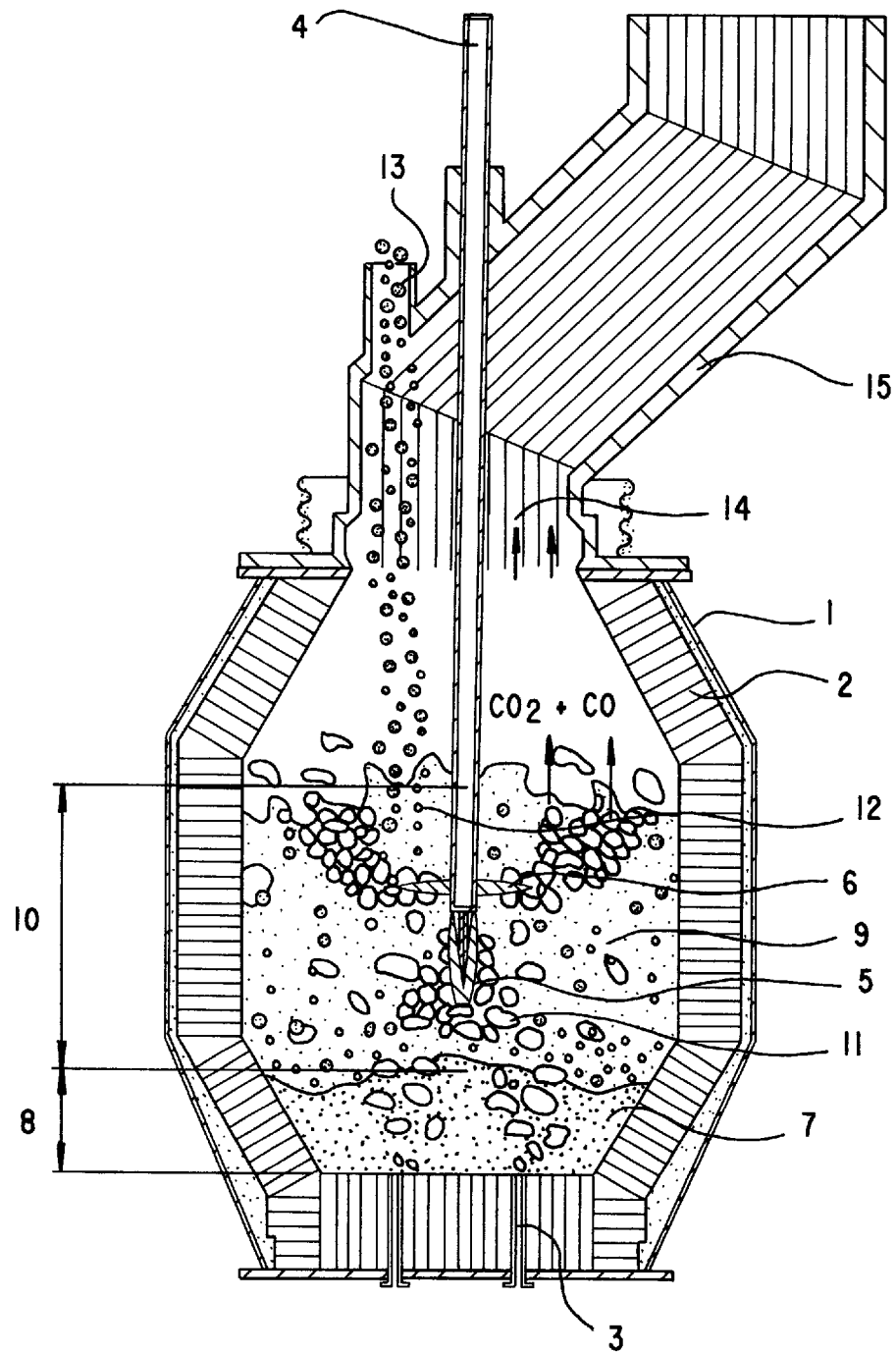

United States Patent [19]
Innes et al.

[11] Patent Number: 5,891,214
[45] Date of Patent: Apr. 6, 1999

[54] SMELTING REDUCTION METHOD WITH INCREASED EFFECTIVENESS

[75] Inventors: John Innes, Kew; Gregory Hardie, East Fremantle, both of Australia

[73] Assignee: Technological Resources Pty. Ltd., Melbourne, Australia

[21] Appl. No.: 636,217

[22] Filed: Apr. 22, 1996

[30] Foreign Application Priority Data

May 18, 1995 [DE] Germany ................ 195 18 343.6

[51] Int. Cl.⁶ ................................................ C21B 13/00
[52] U.S. Cl. ............................ 75/502; 75/504; 75/501
[58] Field of Search ........................ 75/500, 501, 502, 75/504

[56] References Cited

U.S. PATENT DOCUMENTS

| | | | |
|---|---|---|---|
| 2,602,735 | 7/1952 | Howard | 75/502 |
| 5,518,523 | 5/1996 | Brotzmann | 75/501 |
| 5,531,805 | 7/1996 | Worner | 75/10.63 |

FOREIGN PATENT DOCUMENTS

| | | | |
|---|---|---|---|
| 0 308 925 | 3/1989 | European Pat. Off. | |
| 0 327 862 | 8/1989 | European Pat. Off. | |
| 0 418 627 | 3/1991 | European Pat. Off. | |
| 0 592 830 | 4/1994 | European Pat. Off. | |
| 31 32 766 | 6/1982 | Germany. | |
| 34 21 878 | 12/1985 | Germany. | |
| 39 03 705 | 6/1990 | Germany. | |
| 39 93 705 | 6/1990 | Germany. | |
| 63-65009 | 3/1988 | Japan. | |
| 2086431 | 12/1982 | United Kingdom | 75/504 |
| 2109413 | 6/1983 | United Kingdom | 75/501 |

OTHER PUBLICATIONS

Oeters et al, *Stahl Und Eisen*, Entwicklungslinien der Schmeizreduktion, vol. 109, No. 16. 14 Aug. 1989.
Brotzmann, *Howe Memorial Lecture, Aime Symposium* 30 Mar. 1987, pp. 3–12.
Patent Abstracts of Japan, vol. 016, No. 118, JP–A–03 287708 Dec. 18, 1991.
Patent Abstracts of Japan, vol. 013, No. 595, JP–A–01 252714 Oct. 9, 1989.
Patent Abstracts of Japan, vol. 013, No. 362, JP–A–01 119631 May 11, 1989.
JP 61–64 807 A, Patent Abstracts of Japan, Sect. C, vol. 10 (1986) No. 230.
JP 1–252714 A. Patent Abstracts of Japan, Sect. C, vol. 13 (1989) No. 595.
Patent Abstracts of Japan vol. 12 No. 297 JP63–65009, Aug. 12, 1988.

*Primary Examiner*—Melvyn Andrews
*Attorney, Agent, or Firm*—Nikaido Marmelstein Murray & Oram

[57] ABSTRACT

The invention relates to a method for increasing the effectiveness of the smelting reduction of oxidic metal carriers, particularly iron ore, and improving the heat efficiency of the charged fuels in the smelting reduction process which takes place in a reaction vessel containing a molten bath with a layer of slag and wherein the reaction gases escaping from the molten bath are afterburned with oxidizing gases, the resulting heat is transferred to the molten bath and the reacting agents, ore and carbon, are fed to the smelt at least partly from the top through the gas space of the reaction vessel, wherein these reacting agents, ore and carbon, are added in a compact form to the molten bath as a composite material with or without further escort substances.

15 Claims, 1 Drawing Sheet

SMELTING REDUCTION METHOD WITH INCREASED EFFECTIVENESS

This invention relates to a method for increasing the effectiveness of the smelting reduction of oxidic metal carriers, particularly iron ore, and improving the heat efficiency of the charged fuels in the smelting reduction process, which takes place in a reaction vessel containing a molten bath with a layer of slag and wherein the reaction gases escaping from the molten bath are afterburned with oxidizing gases, the resulting heat is transferred to the molten bath, and the reacting agents, ore and carbon, are fed to the smelt at least partly from the top through the gas space of the reaction vessel.

New developments in making metal from the corresponding metal ores are aimed chiefly at using cost-effective reducing agents and energy carriers. For ironmaking the goal is particularly to replace coke by coal.

The smelting reduction of metal ores offers favorable conditions for using coal of various qualities both for compensating the thermal balance of the process and for the reduction reaction itself. The first smelting reduction methods are already being applied in industrial practice. For pig iron making this is the COREX process, and for nonferrous metals, for example for lead production, one must mention the QSL method. For the COREX process, with its relatively high consumption of coal and oxygen, economy can be reached in comparison to the blast furnace process only if the relatively high-energy off-gases are reutilized industrially.

Smelting reduction methods, mainly for pig iron making, in which the supplied fuels are exploited better in the course of the method itself are being developed and have reached the pilot stage in some cases. The publication "Entwicklungslinien der Schmelzreduktion," Stahl und Eisen 109 (1989), No. 16, pages 728 to 742, gives a survey of the various developments for pig iron making. The term "smelting reduction method" is defined in this article as follows. "Molten iron is to be produced in coke-free metallurgy from iron ore directly, if possible without an agglomeration step, whereby "ideally" the reducing and smelting processes take place simultaneously." According to this definition coal is used instead of coke, and ore or ore dust directly, without pretreatment, and one does without the coking plant, on the one hand, and ore dressing plants, on the other. According to these prescribed goals experts are striving to develop smelting reduction methods mainly in this direction.

As various recent publications indicate, known smelting reduction processes which have reached at least the pilot stage work by the abovementioned ideas. Mainly ore dust and coal accordingly serve as charging materials. The ore can be prereduced and heated in a preceding reactor, preferably exploiting the off-gases produced in the smelting reactor, and subsequently charged into the smelting gasifier. For the prereduction step one can use a shaft furnace, rotary tubular furnace or fluidization.

In the CCF process (cyclone converter furnace) one carries out the prereduction up to wustite in a smelting cyclone, from which the melted-down droplets fall through the gas space of a converter-like smelting reduction vessel into the slag-iron bath.

In the Japanese DIOS process (direct iron ore smelting) the solid charge, coal, iron ore and slag-forming agents, is first heated in a preheating vessel, prereduced in a prereduction plant, and the prereduced ore then fed to the converter-like smelting reduction vessel. In the smelting reduction vessel one performs the afterburning of the reaction gases, CO and $H_2$, from the iron smelt in the layer of foamed slag located thereabove with oxygen supply via a lance. In addition nitrogen is passed in via bottom tuyeres for more thorough mixture and motion of the bath. The converter off-gas can be reformed before leaving the smelting reduction vessel by the addition of fine-grained coal to treat it for the following application.

In the HIsmelt process prereduced ore from a circulating fluid bed is passed into the drum-type smelting reduction vessel, and the coal is added through bottom tuyeres. The reaction gases from the smelt are afterburned by top-blown hot air in the reactor. Further solids and also fine-grained ore can be fed to the process through the bottom tuyeres.

The method for intensifying the reactions in metallurgic vessels, described in German patent no. 42 34 974, serves particularly to increase the retransfer of the heat released from the afterburning of the reaction gases to the molten bath in metallurgic reaction vessels. It is characterized in that fractions of the smelt move in the form of droplets, splashes and large particles of the smelt on ballistic flight paths within the gas space of these metallurgic reaction vessels, being spun out of the smelt like a fountain through the amount of gas passed in via underbath tuyeres. This patented method is mainly applied in the HIsmelt process.

A European patent application with the publication number 04 18 927 describes a method for carrying out smelting reduction. A large amount of slag of at least 2000 kg/$m^2$ bath surface is stressed as essential. During the process the slag exists as foamed slag in a layer thickness of at least 2 m to over 4 m. Measurement of the slag layer height indicates the density of the layer of foamed slag, and the addition rates of coal, oxygen and ore are controlled to maintain the layer of foamed slag in the desired density.

A further smelting reduction method wherein tuyeres for decarburization and further tuyeres for afterburning are disposed in a converter-like vessel with a top-blowing lance for oxygen is described in the European patent application with the publication number 03 08 925. Stirring gas is fed through bottom and side wall tuyeres for thorough mixture and concentration balance in the iron smelt and for producing the desired foamed slag thereabove. All solid charging materials, like iron ore, carbonaceous fuels and slag-forming agents, are charged into the smelting reduction vessel above the smelt or blown in via tuyeres from the side from case to case.

The prior art furthermore includes a method and plant for continuous production of pig iron which is set down in German laid-open print no. 34 21 878. This method for continuous production of pig iron from ferriferous materials, particularly iron ores, with simultaneous production of a process gas, is characterized in that the ferriferous materials are fed in the form of green pellets, briquettes, scabs or the like to a traveling grate and preheated, dried and reduced to iron sponge with a degree of reduction of about 90% thereon with the help of the process gas, and the iron sponge is fed from the top directly to a coal gasification reactor with an iron bath and smelted therein with a continuous, separate discharge of iron and slag, with coal and oxygen being blown into the iron bath in the coal gasification reactor preferably from below, and the coal being gasified to a sulfur-free process gas or reducing gas which is fed to the traveling grate for reducing, preheating and drying the briquettes. In the coal gasification reactor of this method there is an overpressure of about 2 bars, and the produced hot process gas leaves the reactor in the area of its hood and is then fed to a hot gas cyclone to be freed from the entrained dust. After that the gas is used in the reduction chamber of the sintering belt for reducing the iron ores.

The average expert starting out from known methods and looking for an economic way of making pig iron from iron ore will recognize a number of disadvantages in these new processes alongside their positive aspects. This finding is strengthened by the fact that no process for making pig iron from ore without use of coke has entered into large-scale industrial practice up to now, apart from the COREX method with its disadvantages of high amounts of surplus gas and considerable oxygen consumption.

In a synopsis of the prior art the smelting reduction methods with high afterburning of the produced process gases, CO and $H_2$, and good heat retransfer show clear advantages in the energy balance. A relatively high dust discharge with the off-gas and thus losses of iron and carbon prove to be disadvantageous. These disadvantages must of course be seen in relation with the manner of adding coal and ore. The control of the hot, liquid constituents of the smelt entrained by the off-gas has likewise not yet been solved satisfactorily in these process variants. However, as soon as the afterburning and the process reactions take place in a foamed slag, the maintenance of the desired layer of foamed slag with regard to density and height and the connected limitations in the reactions raise new problems.

The addition of hot prereduced ore from the top, i.e. through the gas space of the smelting reduction vessel, permits no afterburning of the reaction gases from the smelt because of the danger of oxidation for the metalized ores. Furthermore, the dust discharge is considerable with this manner of adding the prereduced charging materials and makes new demands on the gas cleaning apparatus, leaving aside the losses of material.

The incentive to apply a smelting reduction method for pig iron making to improve the economy over the blast furnace process is obvious to the expert, especially since it permits high energy densities to be achieved in comparison with other process variants, particularly if one includes process gas afterburning, as indicated for instance by Howe Memorial Lecture, 30th Mar. 1987, AIME Symposium Pittsburgh. The use of hot air and an advantageous top-blowing tuyere according to German patent no. 39 03 705 has proven useful. One can thus obtain a degree of afterburning of 55% with a heat retransfer to the iron smelt of 80% in reproducible and reliable fashion.

The present invention is based on the problem of utilizing the advantages of known smelting reduction methods with reaction gas afterburning to increase the heat efficiency of the charged fuels, and to clearly increase the effectiveness of these processes with regard to their economy and reliability for making pig iron cost-effectively from iron ore. A synergistic effect utilizing the advantages of known method steps without the sum of their disadvantages should be realized with relatively simple means in reproducible fashion.

The solution to this problem is that the reacting agents, ore and carbon, are added in a compact form to the smelt as a composite material with or without further escort substances.

The invention is based on the finding that the intimate contact between the reacting agents, ore and carbon, in an agglomerate or composite material leads to a direct reduction reaction between the iron oxide and the carbon. It is therefore not necessary to first melt down the iron ore before the reduction step. The resulting advantages take effect particularly in the reaction rate of reduction and in the afterburning of the reaction gases, CO and $H_2$, above the molten bath. This holds both for smelting reduction methods with a gas space free from foamed slag, for example the HIsmelt process, and for afterburning in a foamed slag, as in so-called deep slag processes.

The finding that the composite material should be added to the smelt in a compact form must be considered an essential feature of the present invention. One should accordingly make sure the composite materials or agglomerates, e.g. pellets or briquettes, are immersed in the smelt as compact units, i.e. without signs of decomposition or bursting. This requirement has turned out to be significant for obtaining to the full extent the surprising advantages of the invention, the increased effectiveness of the smelting reduction of oxidic metal carriers, particularly iron ore, and the improved heat efficiency of the charged fuels in this smelting reduction process. As soon as the composite material is immersed in the smelt in a compact form, the dust discharge with the off-gas from the smelting reduction vessel decreases by at least 20%, and the heat efficiency of the supplied fuels improves by at least 10%, which is due partly to the increased afterburning itself and partly to the improved heat retransfer from the afterburning to the molten bath.

According to the invention the agglomerates or composite materials can be green, dried, preburned and prereduced pellets, briquettes or compacts or any desired mixtures of these various agglomerates.

The reacting agents, ore and carbon, with or without further escort substances, are added as a composite material in a compact form to the smelt in the reaction vessel. This essential feature of the present invention is intended to mean that the carbon content in the agglomerate, for example a pellet or briquette, is at least high enough to suffice for complete reduction of the entrained metal oxide, particularly the iron oxide. In addition it is within the scope of the invention to embed further carbon in the composite material in a free or bound form, for example as hydrocarbon. This fuel in addition to the actual reducing agent for the ore serves to compensate the thermal balance during operation of the smelting reduction method. In practice a portion of the fuels is passed into the smelt in addition for selective process control, for example via bottom tuyeres. However, according to the invention the entire amount of fuel required for the process can also be fed to the smelt via the composite material.

According to the invention the ore can exist in the agglomerate in a lumpy and/or fine-grained form. It can be crude ore, prereduced ore with various degrees of reduction or even complete metalizing. The carbon can likewise be incorporated in any desired way, for example in the form of coal of various qualities, also with high volatile constituents. Coke and other solid carbon carriers and hydrocarbons as well as liquid hydrocarbons in the form of various oil qualities, tar, pitch and refinery waste can be used in the composite materials.

The quality of coal selected has turned out to be fully uncritical, which is especially advantageous for the inventive method. Practically any available coal can be used, from high-grade anthracite to coal qualities with a considerable content of volatile constituents, such as gas-flame coal. The coke or carbon constituents forming after carbonization and cracking of the coal can vary in size, shape and density. In contrast, coal qualities with a high volatile content lead to disadvantages in known methods. For example spontaneous bursting of the coal in the gas space of the reaction vessel is undesirable since this increases the discharge of carbon particles with the off-gas. With the inventive use of composite pellets the agglomerates are deeply immersed in the foamed slag before they burst, for example, and the resulting carbon particles are distributed relatively evenly in the layer of foamed slag and contribute to stabilizing it.

It has turned out, fully unexpectedly and surprisingly, that the inventive use of these agglomerates or composite materials leads to a clear increase in the effectiveness of smelting reduction methods. The dust discharge with the off-gas from the smelting reduction vessel has been considerably decreased, which involves a number of further advantages. The most obvious is a reduction of the iron oxide content in the slag.

When the process is conducted with foamed slag there is less free carbon and a smaller number of carburized iron droplets in the foamed slag in comparison with the known addition of coal and ore. This makes it easier to adjust the layer of foamed slag, and one can obtain clearly higher degrees of afterburning.

The smaller number of reduced droplets and the fractions of smelt in the slag cause the controlled FeO content of the slag, and this relation in turn leads to the decrease in gas reduction between the oxidizing afterburning jet and the carbon in the slag. The carbon content in the slag is lower compared to known processes, due to the direct reduction of the reacting agents, ore and carbon, in the agglomerate. Estimates have shown that the carbon content in the slag can be reduced in this way by about 50%. These lower carbon contents result in additional advantages due to reduced carbon losses during slag tapping and thus a higher output of the supplied fuels.

The improved afterburning, i.e. the increased degree of afterburning of the reaction gases, CO and $H_2$, from the smelt to $CO_2$ and $H_2O$, is due very probably, according to the present level of knowledge, to the lesser reduction of the afterburned reaction gases through the lesser carbon content in the off-gas. The lower dust loading rates in the off-gas firstly take effect in the inventive method here and, in addition, the carbon content in the dust has dropped. These two improvements ultimately cause less carbon to be available in the gas space or foamed slag for reverse reactions with the afterburned off-gas. In other words, the reaction gases afterburned to $CO_2$ and $H_2O$ find fewer free carbon particles for their reduction, i.e. reverse reaction to CO and $H_2$. This idea can explain the unexpected improvements in the afterburning of the reaction gases and thus the improved heat efficiency of the charged fuels with the application of the inventive method.

The inventive method has increased the degree of afterburning of the reaction gases from 55% to up to 70% and the heat retransfer to the iron smelt from 80% to up to 90% under otherwise identical operating conditions, both with foamed slag operation and with operation free from foamed slag.

Compared to known adding techniques, mainly for the reacting agents coal and ore, the method according to the invention has a number of advantages for carrying out a smelting reduction process. The energy balance of the method can be improved altogether by increased afterburning and increased heat retransfer to the smelt. Alongside these economic advantages for the method, one simultaneously increases the smelting rate and thus the iron made per unit of time. These advantages therefore increase the effectiveness of the smelting reduction method. Furthermore it has turned out that the inventive method steps also reduce the consumption of refractory materials. The controlled and selective operation of the process, for example the avoidance of frequent temperature excesses in the smelt during ironmaking, probably has a favorable effect on the rate of wear in the refractory lining of the reaction vessel.

According to the invention it has turned out to be advantageous to drop the composite materials into the bath from a certain height, but at least 0.2 m above the smelt in the smelting reduction vessel. When passing through this distance of fall, for example at a mean speed of 1 m/s or more, the temperature increases and, with it, the heat content of the agglomerates. For this heating of the composite materials it has proven favorable if their form is retained and they are immersed in the smelt as compact briquettes. In other words, decomposition or bursting of the agglomerates in the gas space of the smelting reduction vessel is undesirable.

According to the invention the agglomerates or composite materials can have fundamentally any geometric forms and dimensions. Cubic briquettes are just as possible as spherical ones. In practice the usual, more rounded, spherical and oval forms have proven useful, e.g. egg shape briquettes. The dimensions of these agglomerates can be dependent on the length of the distance of fall in regard to the achievable preheating temperature when passing through the distance of fall. For example, one can use spherical, small briquettes with diameters of 6 mm at a minimum distance of fall of 1 m, and larger briquette diameters of 15 to 50 mm at large distances of fall of up to 10 m in high converter-like smelting reduction vessels. As a rough standard value for the maximum, mean preheating temperature of the composite materials one should take approx. 200° C. This stated preheating temperature can be increased further, however, if the distances of fall of the composite materials are increased, for example. This can be done for instance by utilizing the off-gas systems for preheating the pellets. The composite materials can fall through the off-gas pipe or waste-heat boiler disposed above the smelting reduction vessel, so that one can realize distances of fall of 25 m and possibly more, which correspond to maximum preheating temperatures up to approx. 500° C. A further increase in the agglomerate preheating above 500° C. is undesirable. At clearly higher temperatures there is an increasing probability of agglomerates bursting, for example because of the release of volatile constituents of the charged coal. This decomposition or bursting of the agglomerates before their immersion in the smelt is not in keeping with the inventive method.

Immersion of the composite material, for example pellets or briquettes, in the smelt means in the inventive method that they are at least covered completely by the smelt after immersion, but preferably reach a certain immersion depth in the smelt. In smelting reduction methods which work with a layer of foamed slag, the minimum immersion depth is approx. 0.5 m. Since the thickness of the layer of foamed slag can vary greatly, for example between 2 m to over 4 m, the immersion depth can only be defined very roughly in relation to the foamed slag height. For a relatively small layer height of foamed slag of 2 m, a minimum immersion depth of the composite materials of 0.5 m therefore means ¼ of the foamed slag height.

The smelting reduction methods which work without foamed slag, i.e. in which the afterburning occurs in the free gas space above the smelt, normally have small layer thicknesses of slag of under 1 m, normally between 0.1 m to 0.5 m. The minimum immersion depth of the composite materials is accordingly small, but always deep enough for them to be covered completely with slag.

After reaching the minimum immersion depth the agglomerates can be heated until they decompose partly or completely, for example because of the released volatile constituents in the coal. After reaching the minimum immersion depth of the composite materials in the smelt, preferably in its layer of slag, the agglomerates can decompose. The solid decomposition products, for example high-carbon particles, contribute to stabilizing the foamed slag. In a normal layer of slag, i.e. in the smelting reduction process free from foamed slag, the particles of decomposed composite materials are absorbed very quickly by the molten bath, since there is strong bath motion throughout the smelt and mixtures of slag and metal fractions occur in the boundary layer.

Advantageous application of the method according to the invention for smelting reduction processes which work with a layer of foamed slag results in favorable conditions for maintaining and stabilizing the desired foamed slag with a desired mean density of approx. 1 g/cm$^3$. This foamed slag is constantly in motion; one can observe a flow of slag from the molten bath toward the slag surface and vice versa, but cross currents to this preferred direction of flow also occur. In this moving layer of foamed slag the carbon/coke particles released after decomposition of the agglomerates in the foamed slag do not collect on the foamed slag surface, as in known processes, but flow or stream with the foamed slag itself and are distributed surprisingly evenly in it. Due to the adjusted higher density of the agglomerates or pellets compared to the foamed slag, these composite materials sink into the slag before they decompose and increase the effectiveness of the reaction in the foamed slag. The gases released during decomposition of the pellets have the tendency to adhere to the solid particles, for example the coke particles, and to give them additional buoyancy. However, it has turned out with application of the inventive method that a density of the pellets of approx. 1.5 g/cm$^3$ or more already suffices to guarantee even distribution of the carbon/coke particles in the foamed slag. One can thus reliably prevent the undesirable accumulation of coke particles and their caking on the foamed slag surface as known from usual methods.

In known methods the supplied coal is completely carbonized before being integrated in the slag as carbon particles. The volatile constituents of the coal released above the bath surface have a reducing effect on the oxidizing afterburning gas jet and reduce the degree of afterburning and thus the thermal balance of the process or the heat efficiency of the supplied coal qualities with volatile constituents. For this reason the content of volatile constituents in the coal qualities is limited to less than 20% in foamed slag methods. In the inventive method the release of volatile coal constituents below the foamed slag bath surface results in an increase in the effectiveness of the process, since the reducing gases from decomposition of the coal rise in the foamed slag. This fact results in several advantages for the process run. The reducing gases, CO and H$_2$, released during coal decomposition and soot fractions come in direct contact with the iron oxide-containing slag and lead to metalization of the iron oxides. Also, the reducing gases are available for reaction with the oxidizing afterburning jet partly penetrating into the smelt. Penetration of the afterburning gas jet into the smelt is desirable since it contributes to higher heat retransfer of afterburning energy to the smelt. The additionally produced reaction gases from reaction of the volatile constituents from the coal with the afterburning gas jet below the bath surface lead to increased, advantageous bath motion in the slag. This increased bath motion in turn permits the amount of circulation gas through the underbath tuyeres to be reduced to adjust the desired heat transport in the slag and the desired density of the foamed slag.

According to the invention the density of the composite materials should be set to be higher than the density of the liquid slag in the smelting reduction vessel. For example, it has proven useful to briquette a mixture from ore dust, coal, lime and a binder under high pressure to reach a bulk density of approx. 2.0 g/cm$^3$. With approximately the same composition pellets were produced with a bulk density of 1.6 g/cm$^3$. With the inventive use of these agglomerates in the smelting reduction vessel the slag on the iron bath had a composition of 49% CaO, 32% SiO$_2$, 3% FeO, 17% Al$_2$O$_3$ and thus a density of 2.6 g/cm$^3$. As foamed slag the density is reduced to approx. 0.8 g/cm$^3$.

The inventive method has surprisingly decreased the dust discharge with the off-gas from the smelting reduction vessel in overproportionate fashion. For example, in a pilot plant working by the HIsmelt method about 10 t liquid iron is produced per hour. When using ore and coal, i.e. without a prereduction step for the iron ore, one feeds to the smelt approx. 16 t ore dust per hour with a composition of 63% Fe, 2.6% SiO$_2$, 1% Al$_2$O$_3$, and simultaneously approx. 8 t coal with a volatile content of approx. 10%. The afterburning in the foamed slag-free gas space of the vessel is approx. 50% and the heat retransfer (heat transfer efficiency) to the iron bath approx. 80%. Under these operating conditions the off-gas contains approx. 60 g/Nm$^3$ dust with an approximate carbon content of 15%. However, if the ore dust is passed into the smelt from the top through the gas space of the smelting reduction vessel along with the reduction carbon as an agglomerate, particularly a composite pellet, the dust discharge decreases to 30 g/Nm$^3$ off-gas. Simultaneously the degree of afterburning increases under otherwise identical conditions to 60% with about 85% heat retransfer to the iron smelt.

Accordingly the dust discharge from a smelting reduction vessel can be reduced by applying the inventive method by approx. 50% in comparison to usual smelting reduction operation. A maximum dust discharge of approximately 45 g/Nm$^3$ off-gas is to be expected. The decreased carbon content in the dust is a further advantage. With the inventive method the carbon content in the off-gas dust could be set to values under 8%. Prior to application of the inventive method the carbon contents in the off-gas were approx. 15% with foamed slag.

This decrease in the dust discharge per se and particularly the reduced carbon content in the off-gas dust result in advantages when using the off-gas for prereduction or preheating and mainly in the gas cleaning plant. Along with the above-described improvements in the afterburning of the reaction gases from the iron smelt and the simplifications in adjusting and stabilizing the foamed slag, the improvements in handling the off-gas itself show the unexpectedly clear advantages in adding the reacting agents, ore and carbon, as a composite material by the method according to the invention.

It is conceivable that the increased afterburning is connected with the measurable reduction in the iron oxide content of the slag, mainly when afterburning in a layer of foamed slag. Fewer oxidation reactions probably occur between the gas jet for afterburning and the slag. The smaller content of FeO particles in the slag simultaneously reduces the possibility of the top-blown oxidizing gases oxidizing the FeO molecules. Simultaneously the reduced FeO concentration in the slag causes a clear improvement in the wear of the refractory vessel lining. The wear rates of the refractory lining could be reduced by more than half. The reduced FeO content in the slag also results in higher metal output and thus increased effectiveness of the process compared to known methods.

The invention will now be explained more closely with reference to an exemplary drawing and a nonrestrictive example.

FIG. 1 shows a schematic view of the longitudinal section through a converter-like smelting reduction vessel in which the process takes place with a layer of foamed slag.

The smelting reduction vessel with metal jacket 1 has lining 2, which is penetrated in the bottom area by tuyeres 3. Top-blowing lance 4 has top-blowing tuyere openings 5 for the oxidizing reaction and afterburning tuyeres 6 for afterburning the reaction gases, CO and $H_2$.

Smelting reduction vessel 1 with lining 2 contains molten bath 7 whose depth is shown by arrow 8. Above molten bath 7 is foamed slag 9 with the bath level indicated by arrow 10. Gas bubbles 11 in the smelt are marked by accordingly small light areas, while composite materials 12, in this example pellets, which pass into the smelting reduction vessel through feed opening 13 are shown by dark dots.

Off-gas 14, marked by the small arrows, leaves the smelting reduction vessel through off-gas pipe 15. With off-gas 14 the dust particles, including soot and coal particles, are carried out of the vessel.

The smelting reduction method in the vessel shown in FIG. 1 works with a foamed slag and oxygen top-blowing lance, as is usual for the so-called deep slag process. The entire solid reacting agents are fed to the smelt through feed opening 13 in the form of pellets 12. The pellets contain 65% iron ore and 25% coal (composition approx. 80% C, 10% ash, 10% volatile matter including 2% $H_2O$) as well as 8% CaO as a slag-forming agent and binder. They are green pellets with a bulk density of 2.5 $g/cm^3$. Iron smelt 7 has a weight of 20 t at the onset of the process and at a maximum weight of 40 t 20 t pig iron with a composition of 3.5% C, 95% Fe is tapped off from the vessel through a tap hole not shown. Simultaneously 8.5 t slag with a composition of 38% CaO, 27% $SiO_2$, 17% $Al_2O_3$, 12% MgO, 3% $Fe_{ox}$ is removed from the vessel through a slag tap hole likewise not shown.

During the process one feeds to the smelt approx. 700 kg/min of stated pellets 12. Simultaneously one blows in 7500 $Nm^3/h$ oxygen via lance 4. Approximately 1500 $Nm^3/h$ flows through top-blowing openings 5 and 6000 $Nm^3/h$ through afterburning tuyeres 6.

Through off-gas pipe 15 17000 $Nm^3/h$ off-gas leaves the smelting reduction vessel with a dust loading of 35 $g/Nm^3$.

In addition 1000 $Nm^3/h$ stirring gas, mainly nitrogen, is blown into the smelt through bottom tuyeres 3 to guarantee the necessary bath motion of the iron smelt and the buildup of the layer of foamed slag.

In this operation with a foamed slag a degree of afterburning of 60% at a heat retransfer of 85% was reached by applying the inventive method. By comparison, an afterburning of 50% with a heat retransfer by 80% was reached with the usual operation and mixed addition of the reacting agents through bottom tuyeres or of non-pelletized solids through the gas space. This results in a saving of 200 kg coal/t produced pig iron with the inventive process over the usual operation. At the same time the productivity is increased from 8 t/h pig iron to 10 t/h.

In the off-gas the dust quantity could be reduced by 25 $g/Nm^3$ with the inventive method in comparison to the known operation. It is further significant that the carbon content in the off-gas dust of 15% with the usual operation could be lowered to 6% with the method according to the invention. This results in a number of advantages for the aftertreatment of the off-gas, particularly in the gas cleaning plant.

The method for increasing the effectiveness of the smelting reduction of oxidic metal carriers, particularly iron ore, and improving the heat efficiency of the charged fuels in the smelting reduction process which takes place in a reaction vessel containing a molten bath with a layer of slag, and wherein the reaction gases escaping from the molten bath are afterburned with oxidizing gases, the resulting heat is transferred to the molten bath and the reacting agents, ore and carbon, are fed to the smelt from the top through the gas space of the reaction vessel, which is characterized in that these reacting agents, ore and carbon, are added in a compact form to the molten bath as a composite material with or without further escort substances, can be varied within wide limits without going beyond the scope of the invention. As long as the reacting agents, ore and carbon, are added in a compact form to the molten bath as an agglomerate one is within the scope of the invention, even if the composite material is added to a smelting reduction vessel from different directions and heights, for example. The smelting reduction process itself can of course also be subjected to considerable changes.

We claim:

1. A method for increasing the effectiveness of the smelting reduction of an oxidic metal carrier, and improving the heat efficiency of charged fuels in the smelting reduction, comprising heating and prereducing ore in a composite material comprising ore and carbon in a compact form by feeding the composite material to a reaction vessel by dropping said composite material at least partly from a top area of the reaction vessel, said reaction vessel containing a molten bath having a layer of molten metal and a layer of slag thereon and a gas space above said layer of slag, such that said composite material falls through said gas space and is heated and prereduced in said gas space so that the preheated composite material still has a compact form when being immersed in said molten bath; and supplying oxidizing gases to said gas space at a location different from the area of introduction of the composite material to the reaction vessel, and afterburning reaction gases escaping from said molten bath to produce heat, at least part of said heat produced by said afterburning being transferred to said molten bath and to the said composite material falling in the gas space.

2. The method of claim 1, wherein said composite material is fed to said reaction vessel in the form of pellets, briquettes, compacts, or agglomerates, homogeneously or as mixtures of two or more of said forms.

3. The method of claim 1, wherein said composite material is fed to said reaction vessel in a condition of green, roasted and sintered, or reduced or mixtures of composite material of two or more of said conditions.

4. The method of claim 1, wherein said composite material has a carbon content at least high enough to suffice for complete reduction of said ore in said composite material.

5. The method of claim 1, wherein said composite material has a fuel content high enough that said smelting reduction process is thermally balanced.

6. The method of claim 1, wherein said carbon in said composite material is in a form selected from coal, coke, solid carbon carriers and hydrocarbons.

7. The method of claim 1, wherein said ore in said composite material is selected from lumpy and/or fine-grained untreated or reduced ore with various degrees of prereduction or completely metalized material.

8. The method of claim 1, wherein a prereduction going as far as complete reduction is caused in said composite material by contacting said ore and said carbon.

9. The method of claim 1, wherein said composite materials fall through said reaction vessel to said molten bath and are heated during said fall.

10. The method of claim 1, wherein said composite material is fed to said reaction vessel at a position at least 0.2 m above said layer of slag and/or said composite material passes through said gas space at a mean speed of at least 1 m/s.

11. The method of claim 1, wherein said composite material has a weight-surface ratio such that preheated composite material still has a compact form when being immersed in said molten bath.

12. The method of claim 1, wherein said composite material has a mean maximum temperature of 500° C. when being immersed in said molten bath.

13. The method of claim 1, wherein said composite material has a density which is greater than the density of said slag layer.

14. A method as recited in claim 6, wherein said liquid hydrocarbon is selected from the group consisting of oil, tar, pitch and refinery waste.

15. A method as recited in claim 1, wherein said oxidic metal carrier is iron ore.

* * * * *